United States Patent
Liu et al.

(10) Patent No.: US 10,838,293 B2
(45) Date of Patent: Nov. 17, 2020

(54) DOME SCREEN PROJECTION SYSTEM

(71) Applicant: BROGENT TECHNOLOGIES INC., Kaohsiung (TW)

(72) Inventors: Kuan-Chih Liu, Kaohsiung (TW); Chih-Yung Hsu, Kaohsiung (TW); Ping-Hsiu Wu, Kaohsiung (TW); Pei-Te Su, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 0 days.

(21) Appl. No.: 16/502,820

(22) Filed: Jul. 3, 2019

(65) Prior Publication Data

US 2020/0166830 A1   May 28, 2020

(30) Foreign Application Priority Data

Nov. 23, 2018  (TW) .............................. 107141784 A

(51) Int. Cl.
| | |
|---|---|
| *G03B 21/56* | (2006.01) |
| *G03B 3/00* | (2006.01) |
| *G03B 21/14* | (2006.01) |
| *G09B 27/00* | (2006.01) |
| *G03B 37/00* | (2006.01) |

(52) U.S. Cl.
CPC ............. *G03B 21/56* (2013.01); *G03B 21/14* (2013.01); *G03B 37/00* (2013.01); *G09B 27/00* (2013.01)

(58) Field of Classification Search
CPC ........ G03B 21/56; G03B 21/14; G03B 37/00; G09B 27/00
USPC .......................................................... 353/94
See application file for complete search history.

(56) References Cited

U.S. PATENT DOCUMENTS

| | | | | |
|---|---|---|---|---|
| 3,561,619 A | * | 2/1971 | Weir .................... | B65G 1/1378 414/281 |
| 2010/0300006 A1 | * | 12/2010 | Magpuri .................. | E04H 3/22 52/8 |
| 2011/0249330 A1 | * | 10/2011 | Anderson ................. | E04H 3/22 359/460 |
| 2016/0333597 A1 | | 11/2016 | De Lespinois et al. | |

FOREIGN PATENT DOCUMENTS

| | | |
|---|---|---|
| CN | 203551936 U | 4/2014 |
| CN | 207965462 U | 10/2018 |
| EP | 3392706 A1 | 10/2018 |
| WO | 2015/071693 A1 | 5/2015 |

OTHER PUBLICATIONS

Search Report appended to an Office Action, which was issued to Taiwanese counterpart application No. 107141784 by the TIPO dated May 25, 2020, with an English translation thereof.
Examination Report issued to Australian counterpart application No. 2019204188 by the IP Australia dated May 12, 2020.

* cited by examiner

*Primary Examiner* — Jerry L Brooks
(74) *Attorney, Agent, or Firm* — Muncy, Geissler, Olds & Lowe, P.C.

(57) ABSTRACT

A dome screen projection system includes a dome screen unit and two sets of projectors. The dome screen unit includes a top side, two opposite lateral sides extending downward from two opposite ends of the top side, and a curved projection surface extending downwardly from the top side between the opposite lateral sides. Each of the two sets of projectors are disposed on the top side proximally to one of the lateral sides. The two sets of projectors are directed toward the curved projection surface.

7 Claims, 4 Drawing Sheets

DOME SCREEN PROJECTION SYSTEM

CROSS-REFERENCE TO RELATED APPLICATION

This application claims priority to Taiwanese Patent Application No. 107141784, filed on Nov. 23, 2018.

FIELD

The disclosure relates to a screen projection system, and more particularly to a dome screen projection system.

BACKGROUND

As shown in FIGS. 1 and 2, a conventional dome screen projection system 1 installed inside a building (not shown) includes a dome screen unit 11 having a projection surface 110, a steel support structure 12 disposed in front of the projection surface 110, a catwalk 13 disposed on a top side of the steel support structure 12, and a plurality of projectors 14 disposed on the catwalks 13 and directed to the projection surface 110. Providing the catwalk 13 in addition to the dome screen unit 11 needed for constructing the conventional dome screen projection system 1 can cause uncertainty of whether the catwalk 13 can be integrated with the building (not shown) or the steel support structure 12. Further, the conventional dome screen projection system 1 occupies a relatively large space, and requires extra time for installation. In case different working teams are responsible for the dome screen unit 11 and the catwalk 13, it is hard to coordinate designs of the dome screen unit 11 and the catwalk 13. In addition, working on the catwalks 13 during installation and maintenance is dangerous for workers and is prone to safety problems.

SUMMARY

Therefore, an object of the disclosure is to provide a dome screen projection system that need not provide an extra steel support structure and a catwalk.

According to the disclosure, a dome screen projection system includes a screen unit and at least two sets of projectors.

The dome screen unit includes a top side, two opposite lateral sides extending downward from two opposite ends of the top side, and a curved projection surface extending downwardly from the top side between the opposite lateral sides.

Each of the at least two sets of projectors are disposed on the top side proximally to one of the lateral sides. The at least two sets of projectors are directed toward the curved projection surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
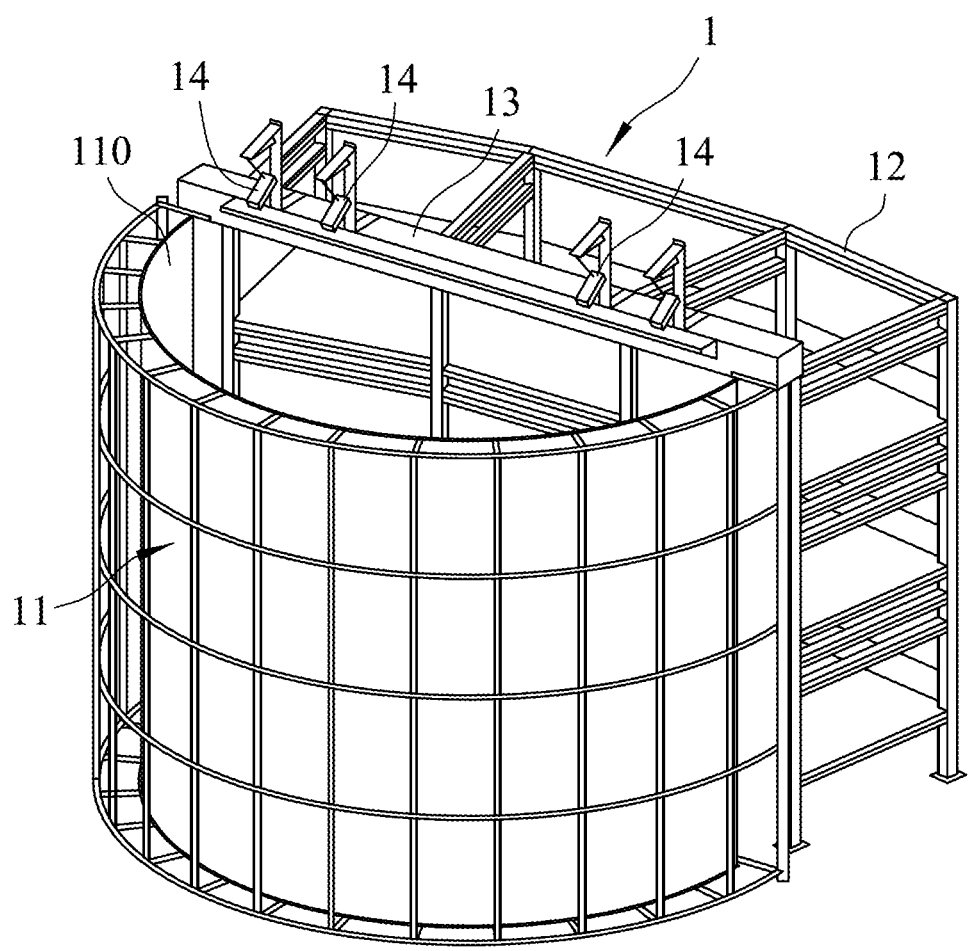
FIG. 1 is a perspective view of a conventional dome screen projection system.
Figure 2:
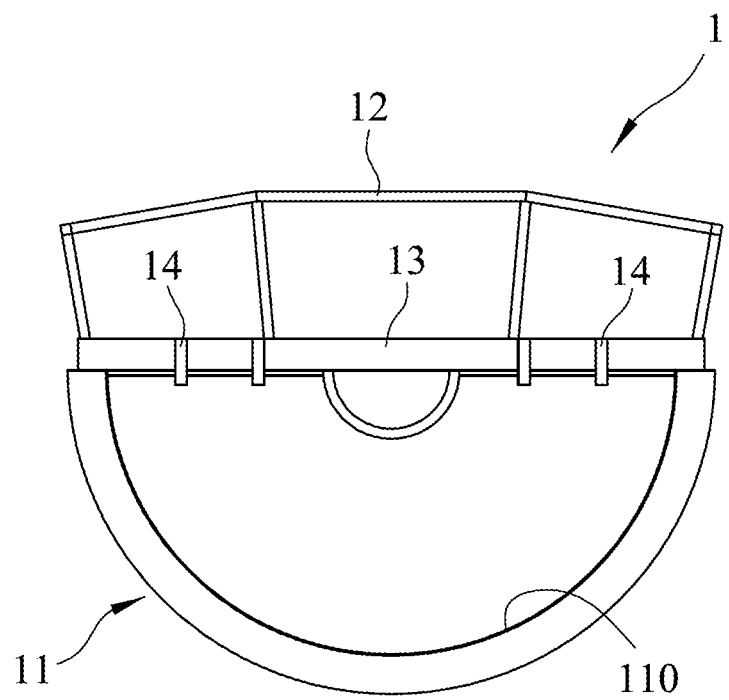
FIG. 2 is a top view of the conventional dome screen projection system.
Figure 3:
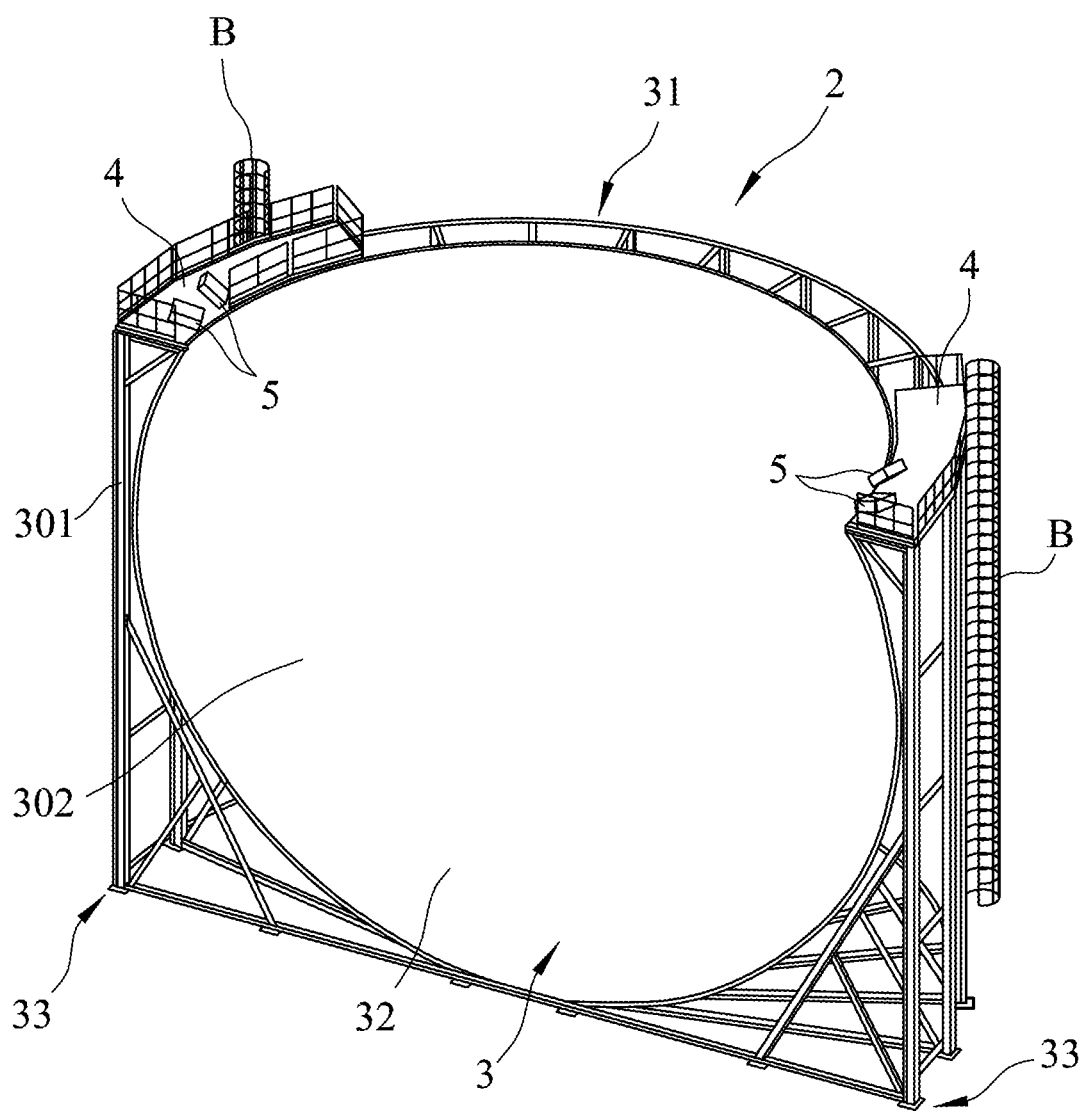
FIG. 3 is a perspective view of an embodiment of a dome screen projection system according to the disclosure.
Figure 4:
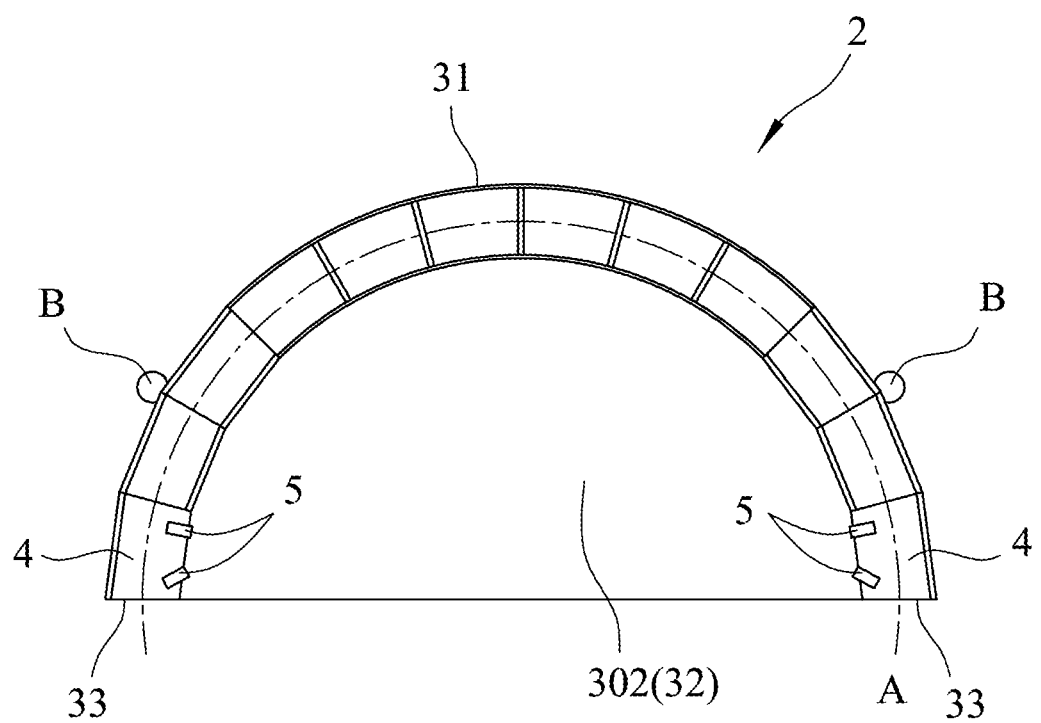
FIG. 4 is a top view of the embodiment.

FIGS. 3 and 4 illustrate an embodiment of a dome screen projection system 2 according to the disclosure for placement in a building structure (not shown). The dome screen projection system 2 includes a dome screen unit 3, two platforms 4, and two sets of projectors 5.

The dome screen unit 3 includes a top side 31, two opposite lateral sides 33, a curved screen panel 302 and a support 301. The top side 31 is curved along a curve line (A) that corresponds to a segment of a circle. The two opposite lateral sides 33 extend downward from two opposite ends of the top side 31. Both of the curved screen panel 302 and the support 301 extend downwardly from the top side 31 of the dome screen unit 3 between the two opposite lateral sides 33 of the dome screen unit 3. The curved screen panel 302 has a curved projection surface 32 extending downwardly from the top side 31 between the two opposite lateral sides 33. The curved projection surface 32 has a shape substantially corresponding to a segmented curved surface of a sphere. The support 301 supports the curved screen panel 30 oppositely of the curved projection surface 32.

The two platforms 4 are disposed on the top side 31 and are respectively proximal to the two opposite ends of the top side 31. In this embodiment, each of the platforms 4 is located within a section of the top side 31 that begins from one of the two opposite ends of the top side 31 and extends in a direction toward a mid part of the top side 31 and that has a length which is equal to one fourth a full length of the top side 31.

Each of the two sets of projectors 5 includes one pair of projectors 5. The pair of projectors 5 are mounted on one of the platforms 4, and are directed toward the curved projection surface 32. The directions of the projectors 5 generally intersect each other.

Noteworthily, arrangements and quantities of the platforms 4 and the projectors 5 are not limited in this embodiment. Based on the size of the dome screen unit 3 and the requirements of image projection, different numbers of the platforms 4 can be disposed on different sections of the top side 31. Further, there can be different numbers of the projectors 5 to be mounted on each platform 4. In addition, when the platforms 4 are not provided, the projectors 5 may be hung on the top side 41.

In this embodiment, because the projectors 5 and the platforms 4 are directly disposed on the dome screen unit 3, there is no need to install the extra steel structure 12 and/or the catwalk 13 used in the conventional dome screen unit, thereby eliminating the problem of uncertainty about the integration of the catwalk 13 encountered in the prior art. By virtue of the dome screen projection system 2 of the embodiment which dispenses with any extra steel support structure and catwalk, labor forces, occupied space, equipment costs and time cost can be saved.

In the conventional dome screen projection system, not only do the catwalk have to be additionally provided, but a worker also has to walk a distance for reaching the projectors. Because the catwalk is hung in air, there may be a high incidence of safety problem in that the worker falls from the catwalk during maintenance or construction. In place of the catwalk, the dome screen projection system 2 of the embodiment is provided with two ladders (B) that are disposed at a back side of the dome screen unit 3 oppositely of the curved projection surface 32, and that respectively extend upwardly to the two platforms 4 from a bottom of the dome screen unit 3. Each platform 4 may be provided with hanging racks (not shown) for hanging tools and other essential things usable for maintenance and construction. The ladders (B) allow workers to climb to the platforms 4 and the workers can easily reach the hanging racks to obtain their necessary tools without walking a long distance on the platforms 4. Therefore, levels of conveniences and safeness may be enhanced.

Because each pair of projectors 5 are mounted on one of the platforms 4 in the embodiment, in comparison with the projectors mounted on the catwalks 13 of the conventional dome screen projection system, a distance between the projectors 5 of the embodiment is shortened to balance brightness of projection lights in an overlap area, thereby reducing difficulties of image fusion for enhancing imaging quality. In addition, the effects of image fusion can also be enhanced by disposing the two sets of projectors 5 respectively on the two sections of the top side 31, which are respectively proximal to the lateral sides 33 of the dome screen unit 3, and whose lengths are equal to one fourth of the full length of the top side 31. However, the disclosure is not limited only to the embodiment.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

The invention claimed is:

1. A dome screen projection system having a system front side to face viewers, comprising:
    a dome screen unit including a top side that has a C-shape viewed from a level above said top side, that has two opposite ends spaced apart at the system front side, and that is concaved rearwardly from said opposite ends, two opposite lateral sides respectively extending downward from said two opposite ends of said top side and spaced apart at the system front side, and a curved projection surface extending downwardly from said top side between said opposite lateral sides, said curved projection surface having a C-shaped top boundary edge extending along said top side, and a C-shaped front boundary edge disposed between said lateral sides, two spaced apart ends of said top boundary edge being respectively connected to two spaced apart ends of said front boundary edge in proximity to said two opposite ends of said top side, said curved projection surface being concaved rearwardly from said front boundary edge; and
    at least two sets of projectors, each of said at least two sets of projectors being disposed on said top side proximally to one of said lateral sides, said at least two sets of projectors being directed toward said curved projection surface to provide front image projection.

2. The dome screen projection system as claimed in claim 1, further comprising at least two platforms disposed on said top side and respectively proximal to said two opposite ends of said top side, said at least two sets of projectors being respectively mounted on said at least two platforms.

3. The dome screen projection system as claimed in claim 2, wherein each of said platforms is located within a section of said top side that begins from one of said two opposite ends of said top side and extends in a direction toward a mid part of said top side and that has a length equal to one fourth a full length of said top side.

4. The dome screen projection system as claimed in claim 2, wherein each of said at least two sets of projectors includes one pair of projectors, said one pair of projectors being mounted on one of said platforms.

5. The dome screen projection system as claimed in claim 3, wherein said top side of said dome screen unit is curved along a curve line that corresponds to a segment of a circle.

6. The dome screen projection system as claimed in claim 1, further comprising at least two ladders that are disposed at a back side of said dome screen unit oppositely of said curved projection surface, and that respectively extend upwardly to said at least two platforms from said bottom side of said dome screen unit.

7. The dome screen projection system as claimed in claim 1, wherein said dome screen unit further includes a curved screen panel having said curved projection surface, and a support supporting said curved screen panel oppositely of said curved projection surface, both of said curved screen panel and said support extending downwardly from said top side of said dome screen unit between said two opposite lateral sides of said dome screen unit.

* * * * *